United States Patent [19]
Karlsson et al.

[11] Patent Number: 5,466,272
[45] Date of Patent: Nov. 14, 1995

[54] SEPARATOR

[75] Inventors: Rolf L. Karlsson; Hernan Tinoco; Mats E. Henriksson, all of Alvkarleby, Sweden

[73] Assignee: Vattenfall Utveckling AB, Sweden

[21] Appl. No.: 196,065

[22] PCT Filed: Jun. 18, 1992

[86] PCT No.: PCT/SE92/00447

§ 371 Date: May 2, 1994

§ 102(e) Date: May 2, 1994

[87] PCT Pub. No.: WO93/05339

PCT Pub. Date: Mar. 18, 1993

[30] Foreign Application Priority Data

Sep. 3, 1991 [SE] Sweden .................................. 9102519

[51] Int. Cl.[6] .................................................. B01D 45/16
[52] U.S. Cl. .................................................. 55/457; 55/237
[58] Field of Search .......................... 55/456, 457, 257.4, 55/237

[56] References Cited

U.S. PATENT DOCUMENTS

| | | | |
|---|---|---|---|
| 3,386,230 | 6/1968 | Riesberg et al. | 55/457 X |
| 3,517,821 | 6/1970 | Monson et al. | 55/457 X |
| 3,961,923 | 6/1976 | Rouhani | 55/457 |
| 4,162,906 | 7/1979 | Sullivan et al. | 55/457 X |
| 4,182,277 | 1/1980 | Burton et al. | 55/457 X |
| 4,602,925 | 7/1986 | Huffman | 55/457 |
| 4,629,481 | 12/1986 | Echols | 55/457 X |

FOREIGN PATENT DOCUMENTS

| | | |
|---|---|---|
| 203896 | 12/1986 | European Pat. Off. . |
| 373451 | 2/1975 | Sweden . |
| 924213 | 4/1963 | United Kingdom . |

*Primary Examiner*—Richard L. Chiesa

[57] ABSTRACT

A steam separator including a tube which houses a blade arrangement consisting of a set of curved blades serving to rotate a mixture of steam and water in order to cause the water to form a film on the inside of the tube. The tube wall has a plurality of perforations through which the water can escape while the steam leaves through a special outlet tube. The individual blade of the blade arrangement has an axial extension at least twice as large as the largest width of the blade, as well as a curvature at least so pronounced that a trailing edge of an optional blade is angularly offset past an imaginary radial plane in the axial extension of a leading edge of an adjacent blade. The total area of the perforations amounts to 50–65% of the cross-sectional area of the separator tube.

10 Claims, 3 Drawing Sheets

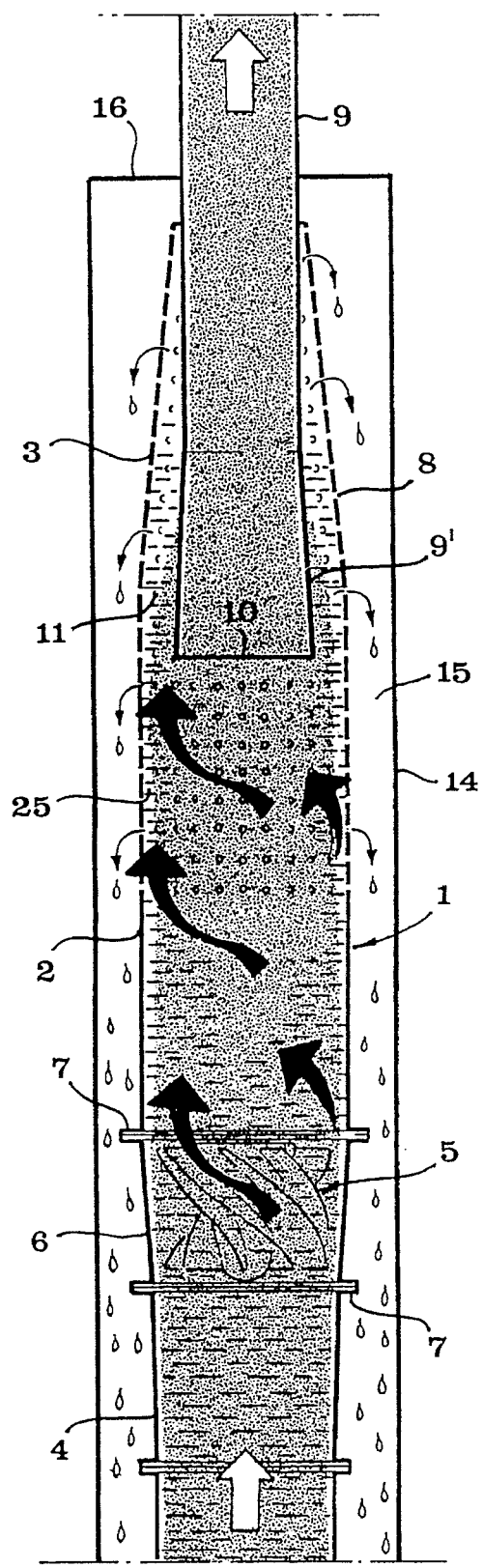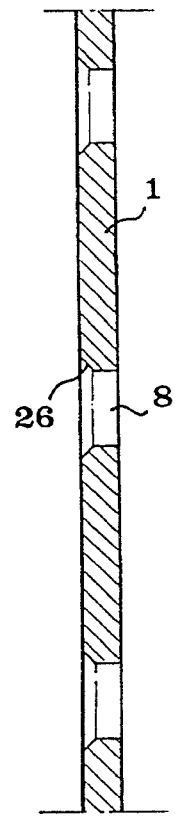
Fig 1
Fig 2

SEPARATOR

FIELD OF THE INVENTION

This invention concerns a separator adapted to separate the two phases in a mixture of a gaseous medium, such as steam, and a liquid medium, such as water, comprising a main tube which houses a means consisting of a set of curved blades which extend between the tube wall and a body centrally located in the tube and which serve to rotate or revolve the two-phase mixture passing through the blade means in order to cause the liquid in the mixture to be applied against the inside of the tube wall, thus forming a film thereon, said main tube comprising, in the area after the blade means, a substantially cylindrical section merging into a tapering or conical section in which is mounted an outlet tube which is adapted for evacuating the gas and which is coaxial with the main tube and has a cross-sectional area smaller than that of the cylindrical section of the main tube, the wall of the main tube having a plurality of perforations through which liquid from said film can escape while being separated from the gas.

Separators of this type are particularly suitable for separating steam and water in water-cooled nuclear reactors so that, as far as possible, only steam is forwarded to the succeeding power-generating turbines. In practice, the steam separators are arranged in a battery of 100–150 units in the upper part of the reactor (the upper plenum) so as to separate the water from the steam before this leaves the reactor and conduct the water to a suitable recipient.

It is a general aim of today's technique that the separation should yield steam which is as dry and free of water as possible to the succeeding turbines. Also, it is an ambition to design the separators so as to give a low and substantially uniform pressure drop. If some separators were to offer a markedly higher flow resistance than other separators in the battery, the mixture of steam and water, which always obeys the law of the least resistance, would naturally find its way through the separators offering the least resistance, while the other separators would remain inoperative or function with low efficiency. This is avoided if the pressure drop is about the same across all the separators. The total pressure drop across the individual separator is in the main determined by two factors: the flow resistance offered by the blade means, and the total area of the perforations in the main tube. If the flow resistance offered by the blade means is small and the perforation area is large, the total pressure drop is slight, and vice versa. In actual practice, however, the total perforation area is restricted by the condition that steam must not leave with the water through the perforations (if the perforation area were too large, steam might accompany the water through the perforations and thus be lost).

DESCRIPTION OF THE PRIOR ART

SE Patent 7309949-1 discloses a separator of the type described by way of introduction. This separator is based on the idea of giving the water-evacuating perforations a restricted total area in order to prevent steam from escaping therethrough, while the blade means is designed to offer a fairly small flow resistance so as not to cause too considerable a pressure drop across the separator. In practice, the total perforation area of the separators manufactured according to the SE patent amounts to 36–38% of the cross-sectional area of the main tube. The restricted flow resistance offered by the blade means is achieved by giving the individual blades a rather small axial extension in relation to their width. Roughly, the axial length of the blades is smaller than, or at the most equal to, their width. Further, the centrally-located body to which all the blades are joined is substantially cylindrical and has a small diameter compared with that of the surrounding tube. In addition, the blades have a comparatively high pitch (in other words a slight curvature). Taken together, these factors cause the two-phase mixture, rushing forward at great speed (e.g. in the order of 50–150 l/s), to pass through the blade means without being effectively forced to execute the desired movement of rotation or revolution. The blades are so slightly curved that a lower leading edge of an optional blade does not even overlap the upper trailing edge of an adjacent blade, which means that the incoming two-phase mixture may, at least partially, move along a substantially axial path without coming into contact with the blades. As a result of this fairly mediocre rotational capacity of the blades, no distinctly coherent water film will form on the inside of the tube. Parts of the mixture will, on the contrary, retain their original indifferent nature also after having passed the blade means, whereby a comparatively large amount of water will accompany the steam through the outlet tube.

OBJECTS OF THE INVENTION

The present invention aims at obviating the above inconveniences of the prior-art separator and providing a separator of improved efficiency. Thus, a basic object of the invention is to provide a separator in which the amount of water accompanying the steam is heavily reduced. Another object of the invention is to provide a separator not only having an improved efficiency but also giving a total pressure drop smaller than, or at the most equal to, the pressure drop across conventional steam separators, thereby making it possible to replace individual steam separators without having to replace all the separators in a battery of separator units.

SUMMARY OF THE INVENTION

According to the invention, these objects are achieved by a separator which is characterised in that the individual blade in said blade means has an axial extension at least twice as large as the largest width of the blade, as well as a curvature at least so pronounced that a trailing edge of an optional blade is angularly offset past an imaginary radial plane in the axial extension of a leading edge of an adjacent blade, and that the total area of the perforations amounts to 50–65%, suitably 55–60%, of the cross-sectional area of the cylindrical portion of the main tube.

The invention is based on the idea to permit an increased pressure drop or flow resistance across precisely the blade means in order to produce a distinct water film on the inside of the tube, while maintaining, however, one and the same total pressure drop across the separator, or even reducing it. This is achieved by increasing the total area of the perforations to at least 50% of the cross-sectional area of the main tube. Such an increase of the perforation area is possible owing to the formation of a distinct water film on the inside of the tube. The water film itself will then be more effective in preventing steam from escaping through the perforations.

FURTHER ELUCIDATION OF THE PRIOR ART

EP 0 203 896 discloses a separator with a film-generating blade means. However, this separator operates with axial separation of the two phases, more precisely in such a manner that the liquid phase will, owing to the centrifugal forces applied thereto, be pressed out through the perforations in the lower part of an upright tube, while the gaseous phase or steam phase is evacuated through the remaining perforations in the upper part of the tube. With this construction, the total perforation area in the separator tube is not optimised in such a manner that a coherent film is formed on the inside of the tube. If the blade means according to EP 0 203 896 were to be mounted in the separator according to SE 373,451, the total pressure drop across the separator would be too considerable to permit inserting this separator as a substitute for an individual separator in a battery comprising a great number of separator units.

BRIEF DESCRIPTION OF THE DRAWINGS

In the drawings,

FIG. 1 is a partial longitudinal section of a separator according to the invention, FIG. 2 is an enlarged partial section of a wall of the separator main tube, illustrating a preferred design of the perforations in this wall.

DETAILED DESCRIPTION OF THE PREFERRED EMBODIMENTS

Figure 5:
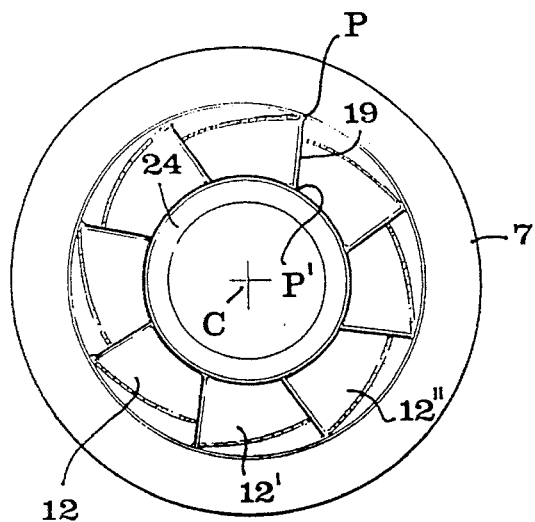
FIG. 5 is an analogous end view of the outlet end of the blade means.

FIG. 1 shows a main tube generally designated 1, mounted vertically in the upper plenum of a water-cooled reactor. The main tube 1 comprises a cylindrical section 2 which, at the top, merges into a tapering or conical section 3, as well as an inlet section 4. In the main tube is mounted a blade means generally designated 5, which serves to impart a movement of rotation or revolution to a mixture of steam and water rushing axially through the inlet section 4. As shown in FIG. 1, the blade means 5 is advantageously mounted in a special tube section 6 connected to the sections 2 and 4 by flanged joints 7. The wall of the main tube has a plurality of small perforations 8.

An outlet tube 9, of smaller diameter than the cylindrical section 2 of the main tube and coaxial with the main tube, is mounted at the upper narrow end of the conical tube section 3. Advantageously, the outlet tube 9 comprises a lower, slightly conical section 9' which widens in the downward direction. The diameter at the inlet opening 10 of the outlet tube is markedly smaller than that of the cylindrical section 2, such that an annular gap 11 is formed therebetween.

Figure 3:
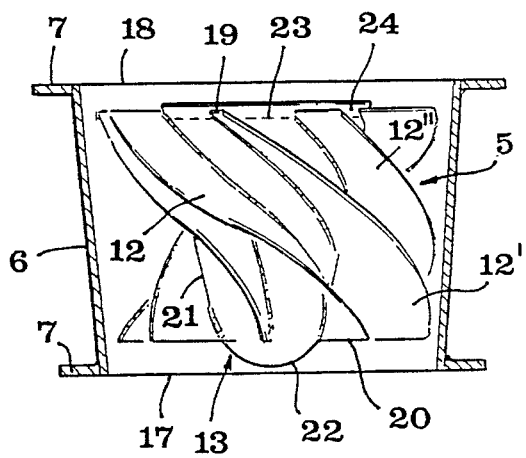
FIG. 3 is a section (enlarged in relation to FIG. 1) of the separator blade means.
Figure 4:
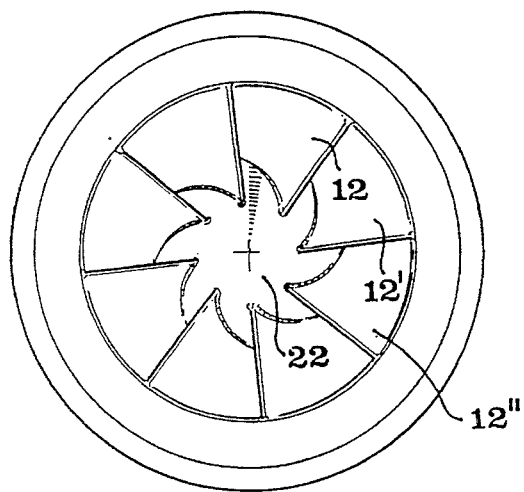
FIG. 4 is an end view of the inlet end of the blade means.

As appears from FIGS. 3–5, the blade means 5 comprises a number of curved blades 12, 12', 12" and so forth, extending substantially radially from a centrally located body 13 to the inside of the tube section 6.

The main tube 1 is enclosed by a tubular cover 14, which has a larger diameter than the main tube, such that an annular gap 15 is formed therebetween. This gap serves as a return passage for water having passed through the perforations 8. At the top, the tubular cover 14 terminates in an annular end wall 16 closing the upper part of the cover.

Thus far, the separator described essentially corresponds to that disclosed in SE 7309949-1.

In FIG. 3, a front end or inlet end of the tube section 6 enclosing the blade means 5 is designated 17, while a rear end or outlet end thereof is designated 18. As appears from FIGS. 3–5, each of the blades 12 of the blade means 5 has an axial extension at least twice as large as the greatest width of the blade. According to another characteristic of the invention, each blade has a curvature which is at least so pronounced that a trailing edge 19 of an optional blade, e.g. the blade 12', is angularly offset past an imaginary radial plane in the axial extension of a leading edge 20 of an adjacent blade, e.g. the blade 12. There is thus formed between each pair of adjacent blades a passage extending partially helically about the centre axis of the tube in such a manner that the inlet opening of the passage is angularly offset laterally so far in relation to the outlet opening of the passage that the onrushing two-phase mixture cannot under any circumstances pass axially through the blade means, not even partially. On the contrary, the mixture will be effectively rotated when passing through the blade means. Also the fact that the blades present a progressively increasing curvature from the inlet end of the blade means towards its outlet end highly contributes to the effective rotation. The leading edge of each blade is thus initially but slightly curved and, consequently, mainly follows the direction of movement of the incoming two-phase mixture, whereupon the blade presents an increasingly greater curvature to finally possess a surface of curvature at pronounced angles to the axial direction.

In a preferred embodiment of the invention, the centrally located body 13 essentially has the shape of a truncated cone. More precisely, the body 13 is defined by a tapered circumferential surface 21, a leading dome-shaped or semi-spherical surface 22, and a trailing flat end surface 23. The conicity of the body 13 is greater than that of the surrounding tube section 6. However, the cone angles of the centrally located body and the tube section are so adjusted to one another that the annular passage formed between the outside of the centrally located body and the inside of the tube section has essentially the same cross-sectional area at the outlet and at the inlet (determined on a level with the trailing and leading edges 19, 20 of the blades). Owing to its conical shape, the centrally located body 13 contributes to guide the two-phase mixture towards the periphery of the main tube 1 when the mixture passes by the blade means. As appears from FIGS. 3 and 5 taken together, the conical centrally located body 13 has, at its rear end, an annular flange 24 in the shape of a truncated cone, the cone angle thereof being slightly larger than that of the centrally located body 13 proper. The annular flange 24 further contributes to guide the two-phase mixture towards the periphery of the main tube when the mixture leaves the blade means.

It should be pointed out that the centrally located body 13 is rather thick compared with the surrounding tube section and takes up a large part of the volume thereof. Thus, the body 13 may at its rear end have a diameter amounting to 45–65%, suitably 50–60%, of the diameter of the tube section 6 in the same cross-sectional plane as the end surface 23.

Another feature that contributes to guide the mixture towards the periphery of the main tube is illustrated in FIG. 5. There, the trailing edge 19 of each blade extends obliquely in relation to an imaginary radius between the centre C of the centrally located body and an outer or peripheral point P on the trailing edge 19. More precisely, the trailing edge 19 is so inclined that an inner point P' is situated some distance ahead of the imaginary radius, as seen in the direction of rotation of the blades. Owing to this inclination, offset from the radial direction, of the leading and trailing edges of the blades, these edges will strive to further guide the two-phase mixture towards the periphery of the main tube, rather than just releasing the mixture in a tangential direction.

With this design, the blade means 5 will set the two-phase mixture in a vigorous movement of rotation or revolution, and the water in the mixture will, under the action of the centripetal force, be applied against the inside of the tube wall 1 to there form a distinct and coherent film 25. As a result, the mixture will, during its passage through the cylindrical section 2 of the main tube, be divided into a liquid phase and a gaseous phase in which the amount of entrained liquid is insignificant compared with that of the separator disclosed in SE 7309949-1. Naturally, the special design of the blade means 5 aiming at producing the distinct film has the side effect of creating an increased flow resistance in the blade means. To compensate for this and provide a separator in which the total pressure drop will at the most be equal to, or even smaller than, the total pressure drop in the separator according to SE 7309949-1, the separator according to the invention has many more perforations 8 than the prior-art separator. According to an important distinctive feature of the invention, the total area of the perforations 8 thus amounts to 50–65%, suitably 55–60%, of the cross-sectional area of the cylindrical section 2 of the main tube. In a model experiment, the total perforation area amounted to 58% of the cross-sectional area of the cylindrical section 2.

In a preferred embodiment of the invention, the individual perforations 8 are, as appears from FIG. 2, bevelled at the inlet opening facing the interior of the main tube. In practice, the bevel 26 may form an angle of 45° with the centre axis of the perforation. Further, the tube wall may have a thickness of 3–4 mm, in which case the perforations 8 have a diameter of 5–6 mm. The depth of the bevel 26 may amount to 1–1.5 mm, i.e. about ⅓ of the wall thickness. Owing to the bevelling of the inlet openings of the perforations, it will be easier for the water rushing through the main tube axially as well as helically and pressed against the inside of the tube wall to escape through the perforations, since it will have a smoother run over the bevelled edge than over a sharp edge.

It should here be emphasised that the perforations 8 are located not only along the conical section 3 of the main tube, but also along parts of the cylindrical section 2. This means that water is removed from the film at an early stage, more precisely on a level at a considerable distance below the inlet opening 10 of the outlet tube 9.

In practice, the cylindrical section 2 of the main tube 1 may have a diameter of 300 mm, in which case the length of the cylindrical section 2 amounts to 700–900 mm, suitably about 800 mm, while the length of the conical section 3 amounts to 500–600 mm, suitably 550 mm. In this case, the length of the tube section 6 may lie within the range of 200–250 mm. If so, the conicity of the tube section 6 may be such that the diameter of this section at the inlet end 17 is 20–40 mm, suitably about 30 mm, smaller than the diameter at the outlet end 18. Assuming that the tube wall has a thickness of 3 mm, the inner diameter of the cylindrical section 2 is 294 mm, which means that the cross-sectional area of this section amounts to about 680 cm$^2$ in absolute numbers. When the main tube is so dimensioned, the total area of all the perforations 8 should amount to about 395 cm$^2$, i.e. about 58% of the cross-sectional area of the main tube. Assuming that the perforations 8 further have a diameter of 6 mm, the number of perforations should be about 1,400, distributed amongst the upper end of the conical tube section 3 and an area approximately at the middle of the cylindrical tube section 2.

The proportion of the perforation area 8 to the cross-sectional area of the tube section 2 may naturally differ in both ways from the given value of 58%. In practice, however, this value should not go below 50%, because the total pressure drop across the separator would then be too considerable. On the other hand, this value should not exceed about 65%, since the distinct coherence of the water film might then be lost, letting steam would escape through the perforations 8.

Figure 6:
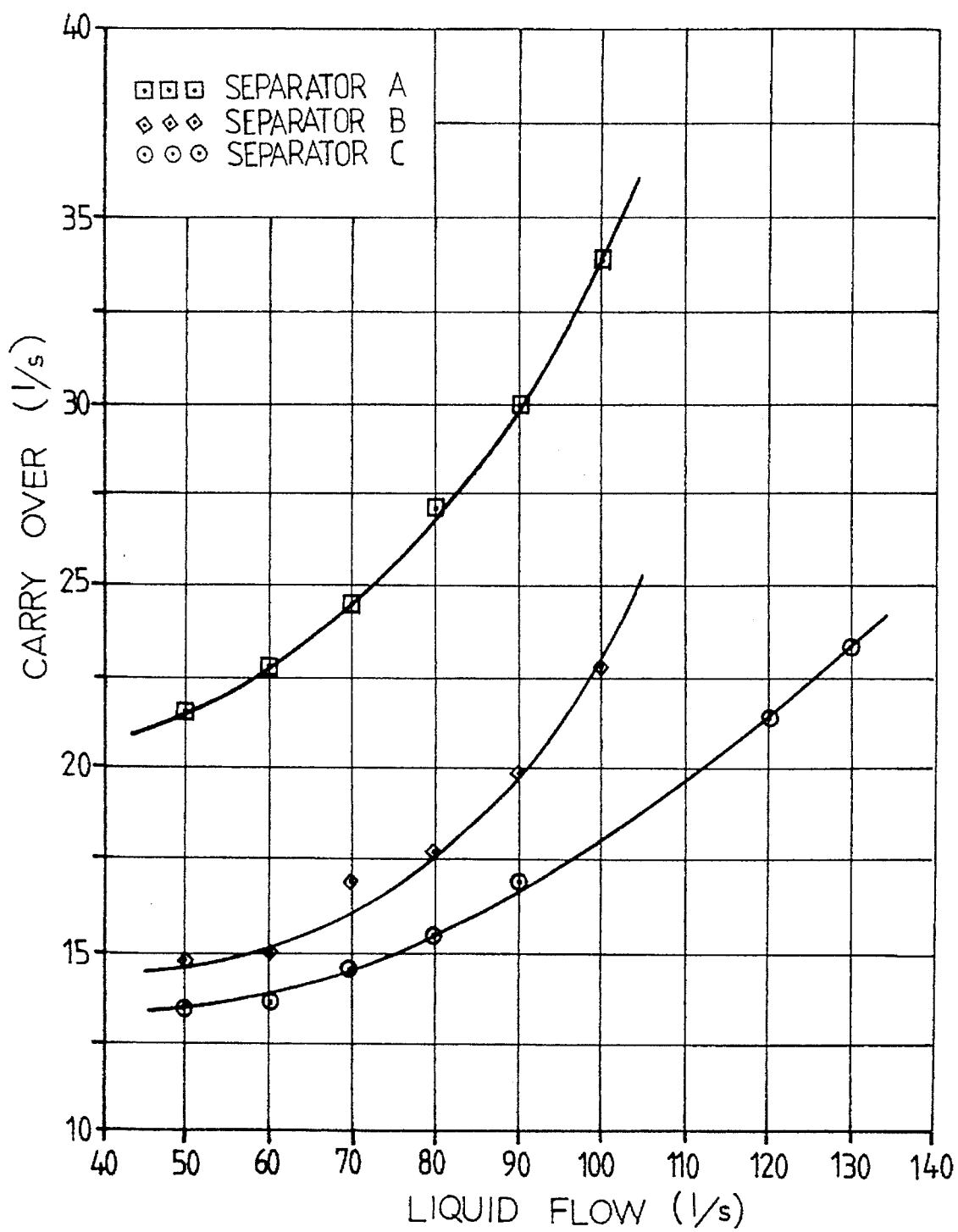
FIG. 6 is a diagram illustrating the efficiency of three different separators; one prior-art separator and two separators according to the invention.

FIG. 6 is a diagram illustrating the results of tests on three different types of separators designated A, B and C. Separator A essentially corresponded to that of SE Patent 7309949-1, separator B was designed according to the invention with cylindrical sharp-edged perforations 8, and separator C was designed according to the invention with perforations 8 bevelled as shown in FIG. 2. The tests involved a mixture of air and water. This two-phase mixture is essentially comparable to a mixture of steam and water. The abscissa axis of the diagram illustrates the liquid flow through the separator in liters per second (l/s), whereas the ordinate axis illustrates the so-called 'carry-over' value in liters per second, i.e. the amount of liquid accompanying the gas through the outlet tube 9. As appears from the diagram, this value is much higher for the conventional separator A than for the two separators B and C according to the invention. If the liquid has a flow rate of 80 l/s, about 27 l/s of liquid was entrained in separator A, whereas the corresponding values for separators B and C were about 17.5 l/s and 15 l/s, respectively. Separator C is especially advantageous when the flow rate is high, since the carry-over value will then be approximately halved compared with prior-art techniques.

We claim:

1. In a separator for separating two phases in a mixture of a gaseous medium and a liquid medium, the separator comprising a main tube having an inside tube wall and a substantially cylindrical section merging into a tapering section, the separator further having blade means with a plurality of blades, said blade means housed within a central body within said main tube for revolving the two-phase mixture passing through said blade means to cause the liquid in the mixture to be applied against said inside wall of said main tube thus forming a film thereon, an outlet tube located at the tapering portion of said main tube and coaxial therewith for evacuating gas, a plurality of perforations located in said main tube wall through which the liquid from the film can escape while being separated from the gas, said outlet tube having a cross sectional area smaller than that of said cylindrical section, the improvement wherein:

each of said plurality of blades of said blade means has an axial extension at least twice as large as the largest width of said blades and a curvature of such a degree that a trailing edge of one of said plurality of blades is angularly offset past an imaginary radial plane in the axial extension of a leading edge of an adjacent blade;

said perforations are located along said tapering section of said main tube and along said cylindrical section of said main tube; and the total area of said perforations being from about 50 to about 65% of the cross-sectional area of said cylindrical portion of said main tube to form a coherent film on the inside of said tube wall.

2. The separator as claimed in claim 1, wherein said gaseous medium is steam and said liquid medium is water.

3. The separator as claimed in claim 1, wherein the total area of said perforations ranges from about 55 to about 60% of the cross-sectional area of said cylindrical portion of said main tube.

4. The separator as claimed in claim 1, wherein said plurality of perforations have bevelled inlet openings facing an interior of said main tube, whereby the liquid penetrability of said perforations is increased, the depth of the bevel being about ⅓ of the thickness of the tube wall.

5. The separator as claimed in claim 4, wherein said perforations have inlet openings bevelled at an angle of about 45°.

6. The separator as claimed in claim 1, wherein said main tube has a tube section surrounding said blade means, said tube section having the shape of a truncated cone, a narrow end of said tube section forming an inlet and a broad end of said tube section forming an outlet; said central body of said main tube having a cone shape, a point of said central body being directed at said inlet so as to form, between an outside of said central body and an inside of said tube section, an annular passage whose cross-sectional area at said inlet is substantially equal to its cross-sectional area at said outlet, the conical shape of said central body contributing to guide the two-phase mixture towards a periphery of said main tube.

7. A separator as claimed in claim 6, wherein said central body has, at said outlet, an annular flange in the shape of a truncated cone, the cone angle thereof being slightly larger than that of said central body, said annular flange further contributing to guide the two-phase mixture towards a periphery of said main tube.

8. A separator as claimed in claim 6, wherein each of said blades has a trailing edge that is located at said outlet and extends obliquely in relation to an imaginary radius between a center of said central body and a peripheral point of said trailing edge.

9. A separator as claimed in claim 8, wherein an inner point of said trailing edge is located a distance ahead of the radius, so as to further contribute to guide the two-phase mixture toward a periphery of said main tube.

10. A separator as claimed in claim 1, wherein the curvature of each of said blades increases progressively in a direction away from said inlet towards said outlet.

* * * * *

UNITED STATES PATENT AND TRADEMARK OFFICE
CERTIFICATE OF CORRECTION

PATENT NO.   : 5,466,272
DATED        : November 14, 1995
INVENTOR(S)  : ROLF I. KARLSSON ET AL.

It is certified that error appears in the above-indentified patent and that said Letters Patent is hereby corrected as shown below:

On the cover page, column 1, under Inventors, "Rolf L. Karlsson" should read --Rolf I. Karlsson--.

Signed and Sealed this

Twenty-third Day of January, 1996

Attest:

BRUCE LEHMAN

*Attesting Officer*   *Commissioner of Patents and Trademarks*